(12) United States Patent
Warren et al.

(10) Patent No.: US 9,654,628 B2
(45) Date of Patent: May 16, 2017

(54) MEDICAL ALERT AND MONITORING FOR THE HEARING IMPAIRED

(71) Applicant: Nedelco, Inc., Aurora, NE (US)

(72) Inventors: Gerald D. Warren, Aurora, NE (US); Jennifer A. Buechner, Madison, WI (US)

(73) Assignee: NEDELCO, INC., Aurora, NE (US)

( * ) Notice: Subject to any disclaimer, the term of this patent is extended or adjusted under 35 U.S.C. 154(b) by 0 days.

(21) Appl. No.: 14/701,781

(22) Filed: May 1, 2015

(65) Prior Publication Data
US 2016/0323445 A1  Nov. 3, 2016

(51) Int. Cl.
  *H04M 3/42* (2006.01)
  *H04W 4/22* (2009.01)
  *H04M 1/725* (2006.01)
  *H04M 3/51* (2006.01)

(52) U.S. Cl.
  CPC ..... *H04M 3/42391* (2013.01); *H04M 1/7255* (2013.01); *H04M 1/72541* (2013.01); *H04M 3/5116* (2013.01); *H04W 4/22* (2013.01); *H04M 2203/252* (2013.01)

(58) Field of Classification Search
  CPC ........... H04M 3/42391; H04M 3/5116; H04M 1/7255; H04M 1/72541; H04M 1/7254; H04W 4/22
  USPC .............................................. 455/575.6, 414.4
  See application file for complete search history.

(56) References Cited

U.S. PATENT DOCUMENTS

| | | | |
|---|---|---|---|
| 8,160,539 B1 * | 4/2012 | Jamshidi | H04M 11/045 379/37 |
| 2010/0323728 A1 * | 12/2010 | Gould | H04M 3/42391 455/466 |
| 2014/0099909 A1 * | 4/2014 | Daly | H04L 51/00 455/404.1 |
| 2015/0163651 A1 * | 6/2015 | Tuck | H04W 4/22 370/259 |

\* cited by examiner

*Primary Examiner* — Brandon Miller
(74) *Attorney, Agent, or Firm* — Foley & Lardner LLP

(57) ABSTRACT

An illustrative method includes receiving, by a processor of a computing device, a request to initiate a call from a portable electronic device. The call is a communication across a communication network. The method also includes initiating, by the processor of the computing device, the call. The call connects the portable electronic device to an emergency response service. The call also utilizes a relay service.

17 Claims, 3 Drawing Sheets

MEDICAL ALERT AND MONITORING FOR THE HEARING IMPAIRED

BACKGROUND

Various technologies have been developed to enable hard-of-hearing individuals communicate using telephone communication systems. For example, text telephones, such as Telecommunication Devices for the Deaf (TDD), enable deaf, hard of hearing, speech-impaired individuals to communicate over the telephone with hearing and speaking parties using conventional telephones. In TDD systems, the hard-of-hearing person typically uses a telephone teletype keyboard or TTY, a specially equipped device with a keyboard, to type messages and a text display for presenting responses to the caller.

Telecommunication relay services or dual-party relay services enable deaf, hard of hearing, speech-impaired individuals to employ text telephones for engaging in a communication session over a telephone network with a person who has a conventional voice telephone. Relay services involve a hard-of-hearing individual using a keyboard to communicate and a display device to understand what is being said by the other party. The hearing person hears what is being said and uses his voice to communicate. A relay communication assistant (CA) acts as the interface in this situation. The CA relays information from one communication protocol to another. For example, the CA types what the hearing person says and sends the text to the hard-of-hearing person. The CA can also read aloud text messages from the hard-of-hearing person so that the hearing person can hear the message.

SUMMARY

An illustrative method includes receiving, by a processor of a computing device, a request to initiate a call from a portable electronic device. The call is a communication across a communication network. The method also includes initiating, by the processor of the computing device, the call. The call connects the portable electronic device to an emergency response service. The call also utilizes a relay service.

An illustrative device includes a memory and a processor coupled to the memory. The processor is configured to receive a request to initiate a call from a portable electronic device. The call is a communication across a communication network. The processor is also configured to initiate the call. The call connects the portable electronic device to an emergency response service and utilizes a relay service.

An illustrative portable electronic device includes a memory and a processor coupled to the memory. The processor is configured to send a request to initiate a call to a home premises electronic device. The call is a communication across a communication network and connects the portable electronic device to an emergency response service. The call also utilizes a relay service. The processor is also configured to receive a first text communication from the home premises electronic device. The first text communication includes a transcription of a first voice audio message from the emergency response service.

BRIEF DESCRIPTION OF THE DRAWINGS

Illustrative embodiments will hereafter be described with reference to the accompanying drawings.

DETAILED DESCRIPTION

Figure 1:
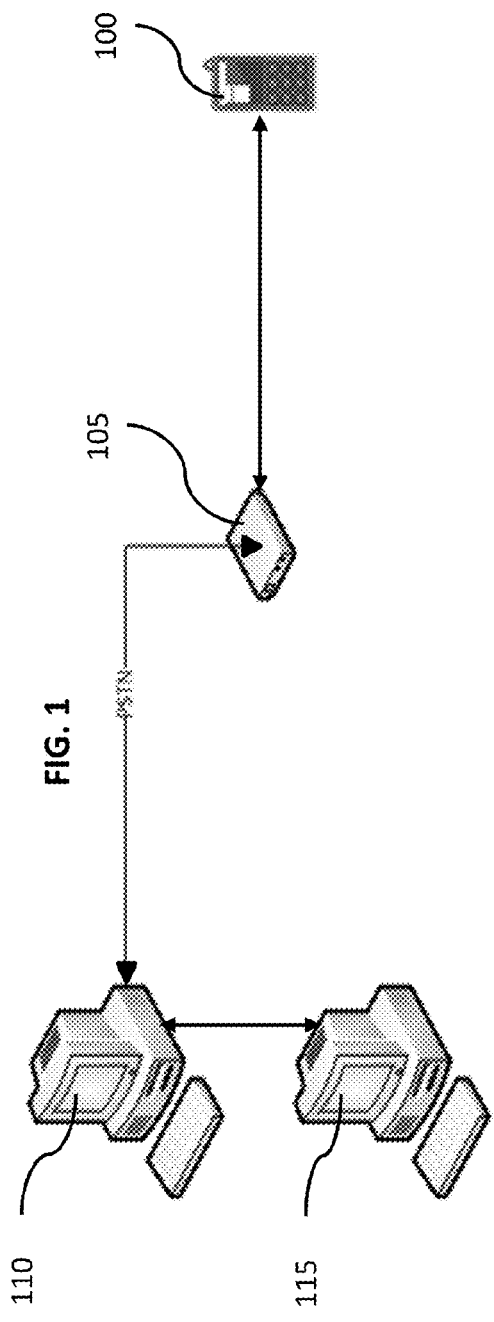
FIG. 1 is a system diagram demonstrating a telephone relay system utilizing direct communication between a relay service and an emergency response service in accordance with an illustrative embodiment.

Described herein are illustrative embodiments for methods and systems that provide telephone relay system for medical alert and monitoring for the hard-of-hearing. The current disclosure is directed to a method, system, device, and computer readable medium for a portable electronic device, a home premises electronic device, emergency response operator, and telephone relay system for the hard-of-hearing. In an illustrative embodiment, a hard-of-hearing individual wears a portable electronic device that is capable of initiating a call in an emergency situation. The portable electronic device can communicate with the home premises electronic device. The home premises device can connect the hard-of-hearing individual to an emergency services operator and a communications assistant (CA) at caption services relay center. In this way, the hard-of-hearing individual can reach an emergency services operator anywhere and be able to communicate effectively with that operator in an emergency. Advantageously, if the hard-of-hearing individual is injured and has decreased mobility or cannot move because of the injury, the hard-of-hearing individual can communicate with an emergency services operator at their present location. The hard-of-hearing individual would not have to relocate to a traditional specialized telephone to communicate, and instead could do so through their portable electronic device. Advantageously, this allows a hard-of-hearing caller, whose mobility is also impaired due to an accident, to effectively seek emergency response services without having to move. Additionally, the hard-of-hearing callers hearing disability does not affect their ability to seek emergency services.

In an illustrative embodiment, a call may be established between a caller and a callee. Often in an emergency scenario, the caller is an individual who is seeking medical attention or other assistance. If the caller is hard-of-hearing, speaking over the phone with a normal emergency services operator may be difficult. As a result, such a caller may utilize telephone relay systems that allow a hard-of-hearing individual to communicate with the emergency services operator. If a hard-of-hearing caller in an emergency scenario calls an emergency services operator, the caller may have a specialized telephone that routes calls through a telephone relay system. In this situation, the caller can talk or type text into the specialized telephone. The caller's spoken words can be transmitted to the emergency services operator. The caller's text inputs can be read aloud by a communications assistant (CA) at a caption services relay center and the reading of the text is communicated to the emergency services operator. In some embodiments, the CA is a speech recognition and voice generation software program that automates the listening and speaking functions of the human CA. The emergency services operator can speak into their telephone normally. The audio from the emergency services operator can be transmitted to the hard-of-hearing individual's telephone. Additionally, the CA can transcribe the spoken words of the emergency services operator. This transcription can be sent to the specialized telephone of the hard-of-hearing individual so that the text can be displayed on the telephone. In this way, the hard-of-hearing individual can read the words spoken by the emergency services operator. Thus, communication between the emergency services operator and the hard-of-hearing individual is accomplished.

However, in some emergency scenarios, the caller in an emergency situation may not be able to reach their specialized phone that would help them adequately communicate with an emergency services operator. In an illustrative embodiment, a portable electronic device allows the caller in an emergency situation to connect to an emergency services operator wherever they are at the time of an emergency. The portable electronic device can connect a caller to an emergency services operator with a single input from the caller. In other words, the caller may only press one button or input in order to connect to the emergency services operator.

In an illustrative embodiment, a system as disclosed herein includes a portable electronic device and a home premises electronic device. If a caller wishes to be connected to an emergency services operator, for example during a medical emergency, the caller can press a button on the portable electronic device. The portable electronic device can then send a signal to the home premises device indicating a request to be connected to an emergency services operator. In this embodiment, the home premises device is at the home of the caller and is geographically remote from the emergency services system and/or the caption services system. The home premises device can connect the portable electronic device to the emergency services operator. In this illustrative embodiment, the communications between the emergency services operator and the caller are both routed through the home premises device. In some embodiments, the portable electronic device may not be able to communicate with the home premises electronic device outside of the caller's home where the home premises device is located.

In an illustrative embodiment, the portable electronic device can receive audio or voice sounds from the caller and transmit the audio to the home premises device. The audio message from the portable electronic device can be transmitted from the home premises device to an emergency services operator and/or a caption service relay operator. The home premises device can also transmit to the portable electronic device an audio message from the emergency services operator and/or the caption service relay operator. The portable electronic device can audibly play the audio message transmitted from the home premises device so that the caller can hear audio from the emergency services operator and/or the caption service relay operator. Additionally, portable electronic device can receive text input from the caller and transmit that text to the emergency services operator and/or the caption service relay operator via the home premises device. The portable electronic device is also equipped with a display that can show text. Text displayed on the portable electronic device is text entered by the emergency services operator and/or the caption service relay operator. The text from the emergency services operator and/or the caption service relay operator is then transmitted to the home premises device which sends the text to portable electronic device. With the combination of audio and text communications between the portable electronic device and the emergency services operator and/or the caption service relay operator, effective communication between a caller in an emergency situation and the emergency services operator can be accomplished.

The caption services relay may be integrated or included in the communication between the caller and the emergency services operator in a variety of ways. In one illustrative embodiment, the emergency services operator and the caption service relay operator are in direct communication. In this embodiment, the home premises device connects to one of the emergency services operator and the caption service relay operator. For example, the home premises device may be communicatively connected to the emergency services operator. The emergency services operator may receive some sort of indication that caption services are needed, and may incorporate the caption services into the call from an emergency services operator system. In other words, the emergency services operator receives a call from a home premises device, and subsequently calls caption services to assist on the call. The indicator that indicates to the emergency services operator that caption services is needed may be automatically sent from the home premises device and or the portable electronic device. In an alternative embodiment, the system may recognize the indicator and automatically connect the emergency services operator to the caption services.

In another alternative embodiment, an identifier from the portable electronic device may also include geo-location information. In other words, the portable electronic device may send a location to the emergency services operator to aid in the emergency services provided. In another embodiment, geo-location information may instead be sent from the home premises device.

In an alternative embodiment, the home premises device may serve as the connectivity between the emergency services operator and the caption service relay operator. In this embodiment, upon receiving a request to initiate a call from the portable electronic device, the home premises device initiates the call to the emergency services operator and initiates communication with a caption service relay operator. In this embodiment, the emergency services operator and the emergency services system does not communicate directly with the caption services system. Instead the two communicate via the home premises device. In this embodiment, the emergency services operator and the emergency services system does not determine whether caption services is needed, nor do they need to initiate caption services. Instead, the home premises device incorporates caption services into the call automatically.

In an alternative embodiment, the caption services and the emergency services systems may be integrated into one caption and emergency services system. In this embodiment, the home premises device initiates a call between the caption and emergency services system. In this embodiment, an operator of the caption and emergency services system uses the system to provide emergency assistance to the caller and also can input text into the system that can be sent to the caller's portable electronic device.

In another alternative embodiment, the home premises device may be integrated into the emergency services system and/or the caption services system. In this embodiment, the signal to initiate a call and the communication messages from the portable electronic device are sent directly to the emergency services system and/or the caption services system to allow the caller to communicate with an emergency services operator.

In another alternative embodiment, the home premises device and the portable electronic device may be integrated into one combined device. In this embodiment, the caller may push a button or other input on the combined device and the combined device can subsequently perform the functions of the home premises device and the portable electronic device. Specifically, the combined device can connect the caller to the emergency services system and/or the caption services system and allow for communication with an emergency services operator.

In an illustrative embodiment, one-touch calling is implemented in the system. In this embodiment, the portable electronic device and home premises device are configured to automatically initiate the call to emergency services based on one single input ("one-touch") from the caller into the portable electronic device. In other words, in this embodiment, the system recognizes the input as an indication that the caller seeks emergency services and responds accordingly. In one embodiment, a specific button or input on the portable electronic device may be designated for the one-touch calling feature. In an alternative embodiment, the portable electronic device may utilize a one-touch plus confirmation calling. In this embodiment, the caller makes an input designating that an emergency call is desired, and then the caller must confirm that an emergency call is desired. This may help prevent accidental calls to emergency services. The confirmation that an emergency call is desired may be through an input such as pressing the same button again, pressing a different button, speaking a voice command, etc.

In an alternative embodiment, one of the devices in the system (such as the home premises device, emergency services system, caption services system, or the portable electronic device) determines whether an account associated with the home premises device and/or the portable electronic device is eligible for emergency services that utilize caption services. In this embodiment, a caller who wishes to utilize the caption service for emergency service may need to sign up for the service, pay for the service, order and/or buy components of the system, install components of the system, and/or set up components of the system. All or some of these steps may be completed in order for the caller to be eligible for an emergency service that utilizes caption services. If it is determined that the caller is not eligible for caption services, then the system does not utilize caption services. In this embodiment, the caller may still be connected to an emergency response service without utilizing caption services. In another embodiment, if the caller is not eligible, the caller will not be connected to an emergency response service and will not utilize caption services.

In an alternative embodiment, the caller may determine whether the call initiated to the emergency response service utilizes caption services. For example, the caller may verbally tell the emergency response service to utilize caption services. In another example, the caller may use an input on the portable electronic device to indicate a request for caption services after the call has been initiated or after a request to initiate the call been inputted.

FIG. 1 is a system diagram demonstrating a telephone relay system utilizing direct communication between a relay service and an emergency response service in accordance with an illustrative embodiment. In alternative embodiments, fewer, additional, and/or different components may be included in the system. FIG. 1 shows a portable electronic device 100, a home premises device 105, an emergency response system 110, and a caption services system 115. The portable electronic device 100 is a specialized device designed for the use in the present system. The portable electronic device includes at least one input button, a speaker, a microphone, wireless communication hardware, and a text display. In other embodiments, the portable electronic device 100 may also include additional input buttons, video display, backlighted input buttons, or other features.

The portable electronic device 100 can communicate with the home premises device 105. This communication is wireless, and may occur through a variety of ways. In an illustrative embodiment, the connection may be similar to that of a cordless telephone. In alternative embodiments, the connection may be through other wireless technology, such as infrared, Wi-Fi, radio, blue tooth, or other wireless communication protocol. The portable electronic device 100 can send to the home premises device 105 a request for emergency response services.

The home premises device 105 is connected to a telephone network, such as the PSTN. The home premises device 105 may have one or more connections to the telephone network. In other words, the home premises device 105 may be connected to multiple phone lines or one phone line. In an alternative embodiment, the home premises device 105 may be connected to the internet and be capable of transmitting text and voice over internet protocol through the internet. No matter how the home premises device 105 is connected to the portable electronic device 100 and the emergency response system 110, the home premises device 105 is capable of transmitting text and audio signals and messages and is capable of initiating a call when a signal requesting a call is received from the portable electronic device 100.

Upon receiving a request for emergency response services, the home premises device 105 can initiate a call to the emergency response system 110. The emergency response system may be a 911 operator or similar. This connection is through a public switched telephone network (PSTN). Such a network may be affected through land communication lines, fiber optic cables, telephone networks, satellite communications, the internet, cellular networks, radio or wireless internet frequencies, and the like, or any combination thereof. In an alternative embodiment, the PSTN may instead be a closed, non-public network used for emergency services or otherwise designated for the system disclosed herein. The emergency response system 110 connects to the caption services system 115. As disclosed herein, the emergency response system 110 may determine based on an account of the caller or an indicator from the home premises device 105 whether to utilize the caption services system 115.

Once a call is established, the portable electronic device 100 can send and receive voice signals and messages to and from the emergency response system 110 through the home premises device 105. The operator using the emergency response system 110 talks into a microphone, and the audio is sent to a speaker on the portable electronic device 100. Additionally, the audio is sent to a communications assistant (CA) using the caption services system 115. The CA hears the audio from the emergency response system 110 and transcribes text according to what is heard on the audio. The transcribed text is sent from the caption services system 115 to a display on the portable electronic device 100. In this embodiment, the transcribed text message is routed through the emergency response system 110 and the home premises device 105. In an alternative embodiment, the transcribed text message may bypass the emergency response system 110 and be sent directly to the home premises device 105 which sends the text on to the portable electronic device 100.

Additionally, the portable electronic device 100 can receive input text which can be transmitted to the emergency response system 110 through the home premises device 105. The text from the portable electronic device 100 is also sent from the emergency response system 110 to the caption services system 115. In an alternative embodiment, the text from the portable electronic device 100 is not sent to the caption services system.

In another alternative embodiment, the emergency response system 110 and the caption services system 115 may be integrated into a single system and call center. In this embodiment, the operator at such a call center can provide emergency assistance, hear audio from the caller, and send text communications to the caller. The operator may also be able to receive text communications from the portable electronic device 100.

In an additional alternative embodiment, the portable electronic device 100 may be a smartphone, blackberry, tablet, laptop, mp3 player, portable telephone, geo-location device, or other type of portable electronic device.

Figure 2:
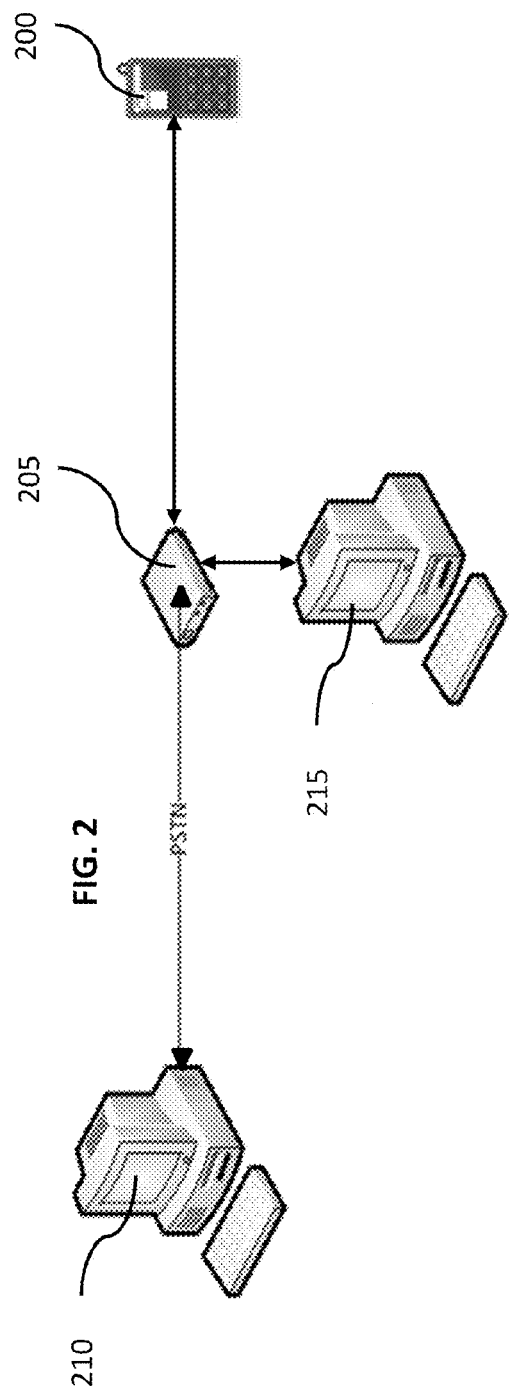
FIG. 2 is a system diagram demonstrating a telephone relay system that does not utilize direct communication between a relay service and an emergency response service in accordance with an illustrative embodiment.

FIG. 2 is a system diagram demonstrating a telephone relay system that does not utilize direct communication between a relay service and an emergency response service in accordance with an illustrative embodiment. In alternative embodiments, fewer, additional, and/or different components may be included in the system. FIG. 2 shows a portable electronic device 200, a home premises device 205, an emergency response system 210, and a caption services system 215. The portable electronic device 200 is a specialized device designed for the use in the present system. The portable electronic device includes at least one input button, a speaker, a microphone, wireless communication hardware, and a text display. In other embodiments, the portable electronic device 200 may also include additional input buttons, video display, backlighted input buttons, or other features.

The portable electronic device 200 can communicate with the home premises device 205. This communication is wireless, and may occur through a variety of ways. In an illustrative embodiment, the connection may be similar to that of a cordless telephone. In alternative embodiments, the connection may be through other wireless technology, such as infrared, wi-fi, radio, blue tooth, or other wireless communication protocol. The portable electronic device 200 can send to the home premises device 205 a request for emergency response services.

The home premises device 205 is connected to a telephone network. The home premises device 205 may have one or more connections to the telephone network. In other words, the home premises device 205 may be connected to multiple phone lines or one phone line. In this embodiment, the home premises device 205 has two phone line connections so that the home premises device 205 can communicate both with the emergency response system 210 and the caption services system 215 simultaneously. In an alternative embodiment, the home premises device 205 may be connected to the internet and be capable of transmitting text and voice over internet protocol through the internet. No matter how the home premises device 205 is connected to the portable electronic device 200, the emergency response system 210, and the caption services system 215, the home premises device 205 is capable of transmitting text and audio signals and messages and is capable of initiating a call when a signal requesting a call is received from the portable electronic device 200.

Upon receiving a request for emergency response services, the home premises device 205 can initiate a call to the emergency response system 210 and the caption services system 215. The emergency response system may be a 911 operator or similar. This connection is through a public switched telephone network (PSTN). Such a network may be effected through land communication lines, fiber optic cables, telephone networks, satellite communications, the internet, cellular networks, radio or wireless internet frequencies, and the like, or any combination thereof. In an alternative embodiment, the PSTN may instead be a closed, non-public network used for emergency services or otherwise designated for the system disclosed herein. The emergency response system 210 communicates seemingly normally with the caller using the portable electronic device 200 if the caller is speaking. That is, the operator of the emergency response system 210 will hear the voice of the caller and the operator's audio will be transcribed by the caption services operator using the caption services system 215 so that the transcribed text of the emergency services operator is sent to the portable electronic device 100. If the caller is entering text, the operator of the caption services system 215 reads the text aloud and the audio is sent to the operator of the emergency response system 210. In this way communication between the caller and the emergency response system 210 operator is accomplished. In this embodiment and as disclosed herein, the home premises device 205 may determine based on an account of the caller or the use of the portable electronic device 100 whether to utilize the caption services system 215.

Once a call is established, the portable electronic device 200 can send and receive voice signals and messages to and from the emergency response system 210 through the home premises device 205. The operator using the emergency response system 210 talks into a microphone, and the audio is sent to a speaker on the portable electronic device 200. Additionally, the audio is sent to a communications assistant (CA) using the caption services system 215. The CA hears the audio from the emergency response system 210 and transcribes text according to what is heard on the audio. The transcribed text is sent from the caption services system 215 to a display on the portable electronic device 200. In this embodiment, the transcribed text message is routed through the home premises device 205. In an alternative embodiment, text received by the portable electronic device 200 can be transmitted to the emergency response system 210 through the home premises device 205.

Figure 3:
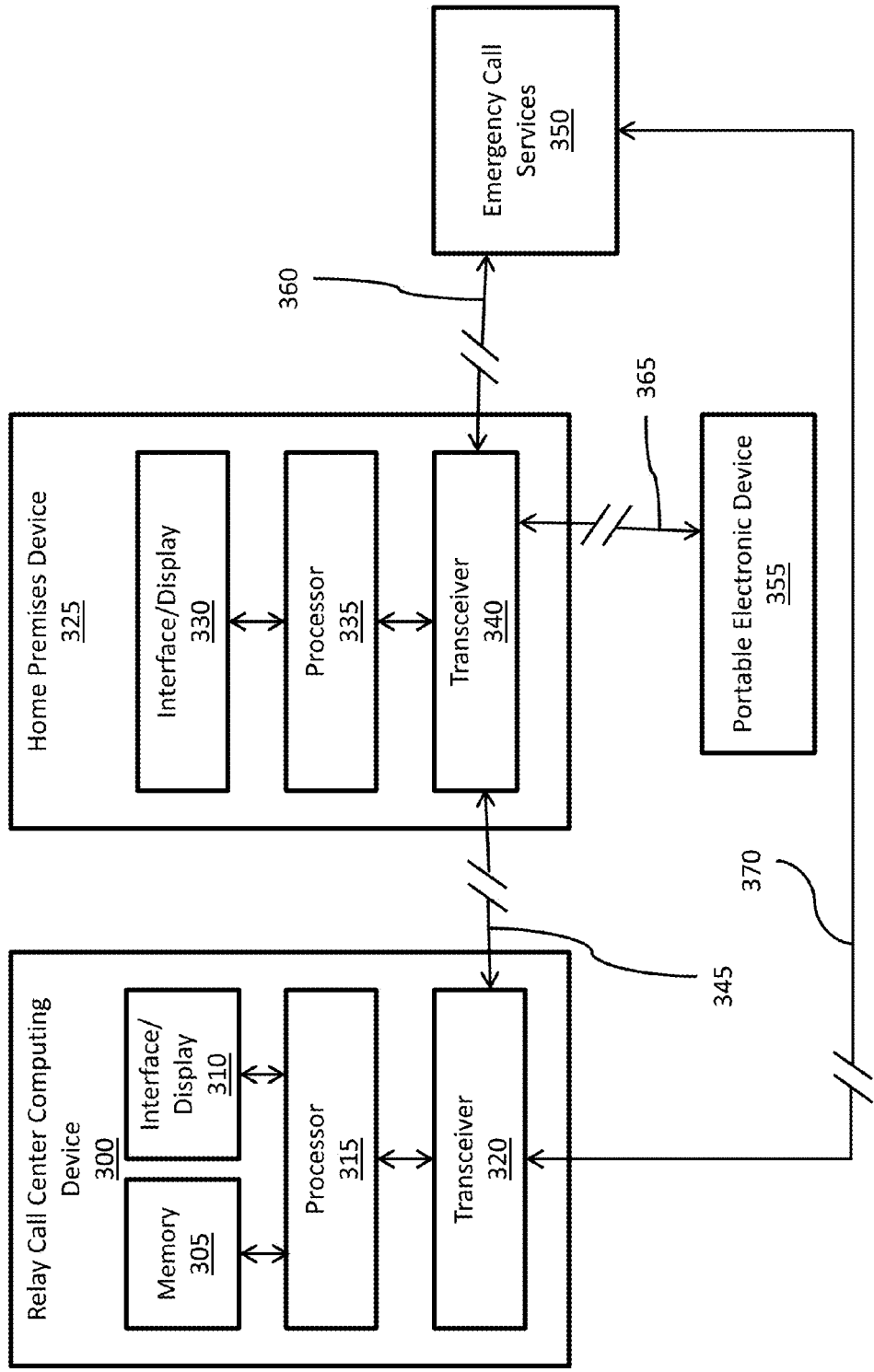
FIG. 3 is a block diagram illustrating computing devices that may be used in a telephone relay system in accordance with an illustrative embodiment.

FIG. 3 is a block diagram illustrating computing devices that may be used in a telephone relay system in accordance with an illustrative embodiment. In alternative embodiments, fewer, additional, and/or different components may be included in the system. In FIG. 3, there is a relay call center computing device 300, a home premises device 325, a portable electronic device 355, and emergency call services 350. The relay call center computing device 300 includes a processor 315 that is coupled to a memory 305. The processor 315 can store and recall data and applications in the memory 305. The processor 315 can execute sets of instructions stored on the memory 305. In one example, a set of instructions may be an application that facilitates a phone call over the internet using voice over internet protocol (VoIP) technology. In another example a set of instructions may be an application that facilitates answering and communicating on a phone call over a public telephone network. The memory 305 may store more than one application. The processor 315 may also display objects, applications, data, text, inputs from a keyboard or microphone, etc. on an interface/display 310. The processor 315 is also coupled to a transceiver 320. With this configuration, the processor 315, and subsequently the relay call center computing device 300, can communicate with other devices, such as the home premises device 325 and the emergency call service 350 through connections 345 and 370.

In an alternative embodiment, all or part of the memory 305 may exist outside the relay call center computing device 300 as a separate database. The database may be accessed by the relay call center computing device 300 similar to the way memory 305 is accessed or similar to the way connection 345 operates as between two transceivers.

The home premises device 325 includes a processor 335 that is coupled to an interface/display 330. The processor 335 is also coupled to a transceiver 340. With this configuration, the processor 335, and subsequently the home premises device 325, can communicate with other devices, such as the relay call center computing device 300, the portable electronic device 355, and the emergency call services 350 through connections 345, 360, and 365.

The home premises device 325 may be a specially designed telephone. For example, the telephone may be equipped to serve as a hub for communications between the portable electronic device 355 and the emergency call services 350, while utilizing the relay call center computing device as disclosed herein. The home premises device may be connected to one or more phone lines. For example, connections 360 and 345 can be a phone line. In an alternative embodiment, the home premises device 325 may include some of the functionality of a wireless online router. In this embodiment, the home premises device 325 can be connected to the internet in order to connect a call over the internet. In such an embodiment, connections 345 and 360 may occur over the internet. In an illustrative embodiment, the home premises device 325 may be incorporated into a special telephone that is used for communication for the hard-of-hearing. In other words, the special telephone may be used normally to place or receive calls and utilize relay services, and may serve as the home premises device 325 as disclosed herein when a caller attempts to place a call using the portable electronic device 355. In an alternative embodiment, the home premises device 325 and/or the portable electronic device 355 may be a smart phone, desktop computer, laptop computer, tablet, personal data assistant, or other electronic device.

In an illustrative embodiment, the portable electronic device 355 is connected to the home premises device 325 through a connection 365 to the transceiver 340. Connection 365 is a wireless connection, and the connection is direct and may only work over a certain distance. In this embodiment, the connection 365 is designed to cover a caller's domicile. That is, whenever they are at home the portable electronic device 355 is in range to communicate with the home premises device 325 through the connection 365. In an alternative embodiment, the connection 365 may utilize a network of receivers and transmitters over a long distance. Allowing for functionality outside of a small range such as a domicile. For example, the network of receivers and transmitters may be a cell phone network and/or internet network.

The emergency call services 350 is an operator service that provides emergency assistance. In an illustrative embodiment, the emergency call services 350 is a 911 operator. In another embodiment, the emergency call services 350 may be an operator center set up and administrated by the provider of the systems and methods provided herein. In another embodiment, the emergency call services 350 may be an operator center administrated by a private security company. In an alternative embodiment, the emergency call services may utilize an electronic device similar to the relay call center computing device 300. In another alternative embodiment, the emergency call services 350 may also function as the relay call center.

In one alternative embodiment, the home premises device 325 and the portable electronic device 355 may be incorporated into one device. For example, the device may be a smart phone. In this embodiment, the caller may select an application (or app) stored on the smart phone and indicate to the app that an emergency call is requested using the methods disclosed herein. In this embodiment, since there is one device, a separate home premises device is not used, and the smart phone is able to connect the caller to the relay call center computing device 300 and/or the emergency call services 350 using the methods disclosed herein.

The devices shown in the illustrative embodiment may be utilized in various ways. For example, the connections 345, 360, 365, and 370 may be varied. The connections 345, 360, 365, and 370 may be a hard wired or wireless connection. A hard wired connection may involve connecting the devices through a USB (universal serial bus) port, serial port, parallel port, or other type of wired connection that can facilitate the transfer of data and information between a processor of a device and a second processor of a second device, such as between the relay call center computing device 300 and the home premises device 325. In another embodiment, the connections 345, 360, 365, and 370 may be a dock where one device may plug into another device. While plugged into a dock, one device may also have its batteries charged or otherwise be serviced. In other embodiments, the connections 345, 360, 365, and 370 may be a wireless connection. Such a connection may take the form of any sort of wireless connection, including but not limited to blue tooth connectivity, Wi-Fi connectivity, or another wireless protocol. Other possible modes of wireless communication may include near-field communications, such as passive radio-frequency identification (RFID) and active (RFID) technologies. RFID and similar near-field communications may allow the various devices to communicate in short range when they are placed proximate to one another. In an embodiment using near field communication, two devices may have to physically (or very nearly) come into contact, and one or both of the devices may sense various data such as acceleration, position, orientation, velocity, change in velocity, IP address, and other sensor data. The system can then use the various sensor data to confirm a transmission of data over the internet between the two devices. In yet another embodiment, the devices may connect through an internet (or other network) connection. That is, the connections 345, 360, 365, and 370 may represent several different computing devices and network components that allow the various devices to communicate through the internet, either through a hard-wired or wireless connection. The connections 345, 360, 365, and 370 may also be a combination of several modes of connection.

To operate different embodiments of the system or programs disclosed herein, the various devices may communicate in different ways. For example, the relay call center computing device 300, portable electronic device 355, and home premises 325 device may download or have installed upon them various software applications. Such software applications may allow the various devices in FIG. 3 to perform some or all of the processes and functions described herein. Additionally, the embodiments disclosed herein are not limited to being performed only on the disclosed devices in FIG. 3. It will be appreciated that many various combinations of computing devices, specialized telephonic devices, and portable electronic devices may execute the methods and systems disclosed herein. Examples of such computing devices may include desktop computers, cloud servers, smart phones, personal computers, servers, laptop computers, tablets, blackberries, RFID enabled devices, or any combinations of such devices or similar devices.

In an alternative embodiment, programs run by various electronic, computing, and/or telephonic devices may be internet-based applications, where the program is executed by a web browser or other internet enabled application. Temporary files and/or a web browser may be used on the relay call center computing device 300, home premises device 325, and/or the portable electronic device 355 in order to execute a program, system, application, etc. in this manner.

The configuration of the home premises device 325, the relay call center computing device 300, the portable electronic device 355, and the emergency call service 350 is merely one physical system on which the embodiments disclosed herein may be executed. Other configurations of the devices shown may exist to practice the disclosed embodiments. Further, configurations of additional or fewer devices than the ones shown in FIG. 3 may exist to practice the disclosed embodiments. Additionally, the devices shown in FIG. 3 may be combined to allow for fewer devices or separated where more than the two devices shown exist in a system.

In other embodiments, specialized hardware may exist in the devices shown in FIG. 3 that is specifically designed to perform or execute the various embodiments disclosed herein. For example, a microphone and/or speaker may be used at the relay call center computing device 300, home premises device 325, emergency call services 350, and/or portable electronic device 355 to receive and output audio voice signals and messages. The relay call center computing device 300, home premises device 325, emergency call services 350, and/or portable electronic device 355 may also have a display screen that can display text or data. The screen may even be a touch screen, capable of receiving inputs from a caller, emergency services operator, or a communication assistant (CA). Any of the relay call center computing device 300, home premises device 325, emergency call services 350, and/or portable electronic device 355 may have other input hardware such as a mouse, keyboard, touchpad, number pad, rotary dialer, or other buttons for functions such as voicemail, directory, caller id, call forwarding, volume, or the like.

Figure 4:
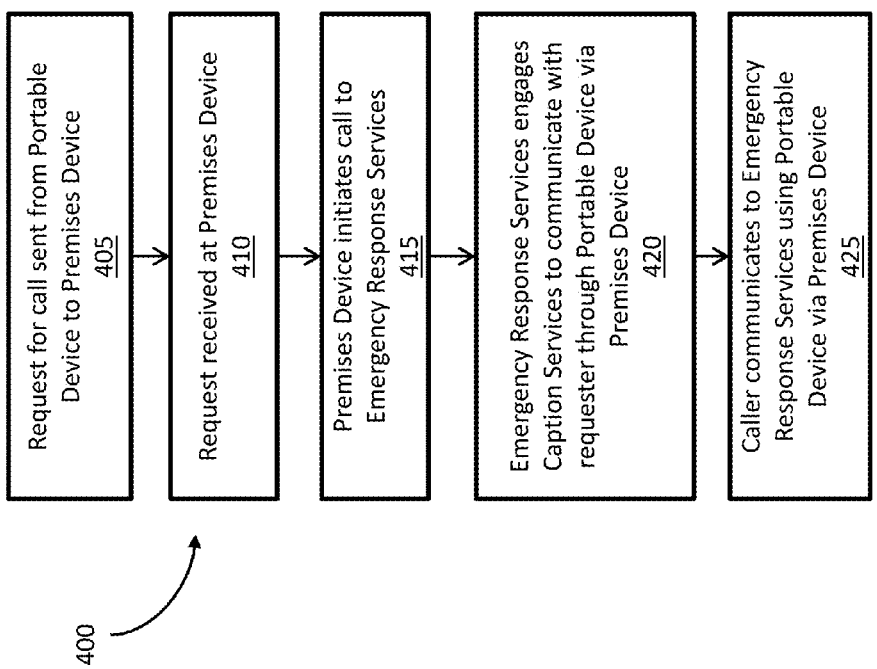
FIG. 4 is a flow diagram illustrating a method of establishing a call for use in a telephone relay system that utilizes direct communication between a relay service and an emergency response service in accordance with an illustrative embodiment.

FIG. 4 is a flow diagram illustrating a method 400 of establishing a call for use in a telephone relay system that utilizes direct communication between a relay service and an emergency response service in accordance with an illustrative embodiment. In alternative embodiments, fewer, additional, and/or different operations may be performed. Also, the use of a flow diagram is not meant to be limiting with respect to the order of operations performed. In an operation 405, a request for a call is sent from a portable electronic device to a home premises device. In an illustrative embodiment, a caller who is experiencing an emergency situation, such as a medical emergency or a fire within their home, presses a button on their portable electronic device. By pressing the button, the caller indicates a desire for an emergency call and a desire for emergency response services.

In an operation 410, the request for the call is received at the home premises device. As described herein, the request can be sent wirelessly from the portable electronic device to the home premises device. The home premises device is designed to receive the wireless communication requesting the call. In an operation 415, the home premises device initiates the call to emergency response services. The home premises device in this embodiment is pre-programmed with the proper instructions and/or telephone number to initiate a call to emergency response services. In this way, the home premises device can automatically initiate the call to emergency response services.

In an operation 420, the emergency response services engages caption services to communicate with the requester of the call through the portable electronic device via the home premises devices. This embodiment corresponds to the process flow diagram discussed above with respect to FIG. 1. In this embodiment, the home premises device engages with the emergency response services, and the emergency response services engages with the caption services. In this way, effective communication between a hard-of-hearing caller and emergency response services can be accomplished.

In an operation 425, the caller communicates to emergency response services using the portable electronic device. The caller in this embodiment is able to verbally communicate to the emergency response services. The caller can also enter text into the portable electronic device which is sent to the caption services and read aloud for the emergency response services operator to hear. The emergency response services can verbally communicate to the caller. Additionally, the audio from the emergency response services is sent to caption services, where the audio is transcribed and sent as text to a display on the portable electronic device. In this way, the caller can both hear and/or read communications and instruction from the operator from the emergency response services.

Figure 5:
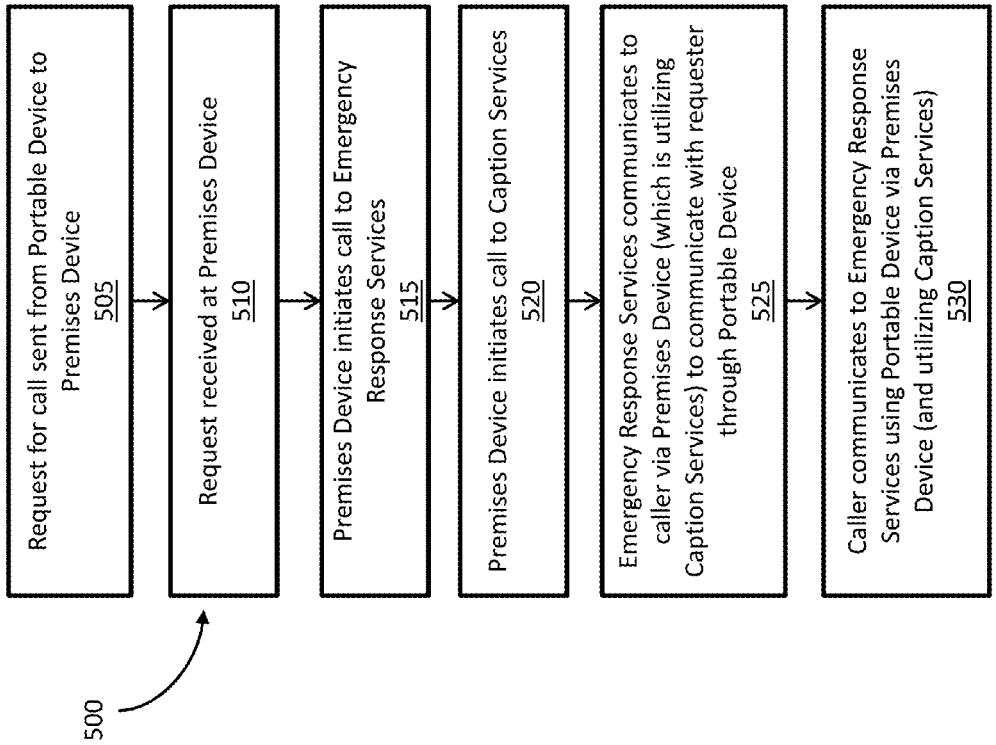
FIG. 5 is a flow diagram illustrating a method of establishing a call for use in a telephone relay system that does not utilize direct communication between a relay service and an emergency response service in accordance with an illustrative embodiment.

FIG. 5 is a flow diagram illustrating a method 500 of establishing a call for use in a telephone relay system that does not utilize direct communication between a relay service and an emergency response service in accordance with an illustrative embodiment. In alternative embodiments, fewer, additional, and/or different operations may be performed. Also, the use of a flow diagram is not meant to be limiting with respect to the order of operations performed. In an operation 505, a request for a call is sent from a portable electronic device to a home premises device. In an illustrative embodiment, a caller who is experiencing an emergency situation, such as a medical emergency or a fire within their home, presses a button on their portable electronic device. By pressing the button, the caller indicates a desire for an emergency call and a desire for emergency response services.

In an operation 510, the request for the call is received at the home premises device. As described herein, the request can be sent wirelessly from the portable electronic device to the home premises device. The home premises device is designed to receive the wireless communication requesting the call. In an operation 515, the home premises device initiates the call to emergency response services. The home premises device in this embodiment is pre-programmed with the proper instructions and/or telephone number to initiate a call to emergency response services. In this way, the home premises device can automatically initiate the call to emergency response services.

In an operation 520, the home premises device also initiates the call to caption services. The home premises device in this embodiment is pre-programmed with the proper instructions and/or telephone number to initiate a call to caption services. In this way, the home premises device can automatically initiate the call to caption services. As disclosed herein, the audio and text communications between the emergency response services, portable electronic device, and the home premises device are configured so that the caller using the portable electronic device and an operator at the emergency response services can communicate effectively even if the caller is hard-of-hearing. This embodiment corresponds to the process flow diagram discussed above with respect to FIG. 2. In this embodiment, the home premises device engages with the emergency response services and the caption services. In this way, effective communication between a hard-of-hearing caller and emergency response services can be accomplished.

In an operation 525, the emergency response services communicates with the caller. In an operation 530, the caller communicates to emergency response services using the portable electronic device. The caller in this embodiment is able to verbally communicate to the emergency response services. The caller can also enter text into the portable electronic device which is sent to the caption services and read aloud for the emergency response services operator to hear. The emergency response services can verbally communicate to the caller. Additionally, the audio from the emergency response services is sent to caption services, where the audio is transcribed and sent as text to a display on the portable electronic device. In this way, the caller can both hear and/or read communications and instruction from the operator from the emergency response services.

In an illustrative embodiment, any of the operations described herein can be implemented at least in part as computer-readable instructions stored on a computer-readable medium or memory. Upon execution of the computer-readable instructions by a processor, the computer-readable instructions can cause a computing device to perform the operations.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method comprising:
receiving, by a processor of a computing device, a request to initiate a call from a portable electronic device, wherein the call is a communication across a communication network;
initiating, by the processor of the computing device, the call, wherein the call connects the portable electronic device to an emergency response service, and further wherein the call utilizes a relay communication assistant intermediate the portable electronic device and the emergency response service;
receiving, by the processor of the computing device, a first text communication from the relay communication assistant comprising a transcription of a first voice audio message from the emergency response service;
sending, by the processor of the computing device, the first text communication to the portable electronic device;
receiving, by the processor of the computing device, a second voice audio message from the portable electronic device;
sending, by the processor of the computing device, the second voice audio message to the relay communication assistant; and
sending, by the processor of the computing device, the second voice audio message to the emergency response service.

2. The method of claim 1, further comprising:
receiving, by the processor of the computing device, a second text communication from the portable electronic device; and
sending, by the processor of the computing device, the second text communication to the emergency response service.

3. The method of claim 1, further comprising:
receiving, by the processor of the computing device, a second text communication from the portable electronic device; and
sending, by the processor of the computing device, the second text communication to the relay communication assistant.

4. The method of claim 1, further comprising determining that a user profile associated with the portable electronic device is eligible to communicate with the relay communication assistant.

5. The method of claim 1, wherein the portable electronic device and the computing device are separate devices.

6. The method of claim 1, wherein the portable electronic device and the computing device are the same device and both utilize the processor.

7. The method of claim 1, wherein the call comprises a communication over a phone line.

8. The method of claim 1, wherein the call comprises a communication over an internet connection.

9. The method of claim 1, wherein the call is automatically initiated by the processor upon receiving the request.

10. The method of claim 9, wherein the request comprises a request for a call to the emergency response service, and further wherein the request does not include a particular phone number or internet address to which the call should be made.

11. A device comprising:
a memory; and
a processor coupled to the memory, wherein the processor is configured to:
receive a request to initiate a call from a portable electronic device, wherein the call is a communication across a communication network;
initiate the call, wherein the call connects the portable electronic device to an emergency response service, and further wherein the call utilizes a relay communication assistant intermediate the portable electronic device and the emergency response service;
receive a first text communication from the relay communication assistant comprising a transcription of a first voice audio message from the emergency response service;

send the first text communication to the portable electronic device;
receive a second voice audio message from the portable electronic device;
send the second voice audio message to the relay communication assistant; and
send the second voice audio message to the emergency response service.

12. The system of claim 11, wherein the call is automatically initiated by the processor upon receiving the request.

13. The system of claim 12, wherein the request comprises a request for a call to the emergency response service, and further wherein the request does not include a particular phone number or internet address to which the call should be made.

14. A portable electronic device comprising:
a memory; and
a processor coupled to the memory, wherein the processor is configured to:
send a request to initiate a call to a home premises electronic device, wherein:
the call is a communication across a communication network;
the call connects the portable electronic device to an emergency response service; and
the call utilizes a relay communication assistant intermediate the portable electronic device and the emergency response service;
receive a first text communication from the home premises electronic device comprising a transcription of a first voice audio message from the emergency response service; and
send a second voice audio message to the home premises electronic device, wherein the home premises electronic device communicates the second voice audio message to the emergency response service and the relay communication assistant.

15. The portable electronic device of claim 14, the portable electronic device further comprising a user interface, and further wherein the processor is further configured to receive an input from the user interface, wherein the request is sent in response to the input.

16. The portable electronic device of claim 15, wherein the input is a one touch input that indicates a need for the emergency response service.

17. The portable electronic device of claim 15, wherein the input does not include a particular phone number or internet address to which the call should be made.

* * * * *